No. 665,952. Patented Jan. 15, 1901.
J. P. CALDWELL.
COOKING APPARATUS.
(Application filed Dec. 13, 1899.)

(No Model.) 2 Sheets—Sheet 1.

WITNESSES
Carl B. Larson
F. A. Stewart

INVENTOR
John P. Caldwell
BY
Edgar Tate
ATTORNEYS

No. 665,952. Patented Jan. 15, 1901.
J. P. CALDWELL.
COOKING APPARATUS.
(Application filed Dec. 13, 1899.)
(No Model.) 2 Sheets—Sheet 2.

WITNESSES
INVENTOR
John P. Caldwell
BY
Edgar Tate & Co.
ATTORNEYS

UNITED STATES PATENT OFFICE.

JOHN PARK CALDWELL, OF GAINESVILLE, GEORGIA.

COOKING APPARATUS.

SPECIFICATION forming part of Letters Patent No. 665,952, dated January 15, 1901.

Application filed December 13, 1899. Serial No. 740,145. (No model.)

*To all whom it may concern:*

Be it known that I, JOHN PARK CALDWELL, a citizen of the United States, residing at Gainesville, in the county of Hall and State of Georgia, have invented certain new and useful Improvements in Cooking Apparatus, of which the following is a full and complete specification, such as will enable those skilled in the art to which it appertains to make and use the same.

This invention relates to steam cooking apparatus; and the object thereof is to provide an apparatus of this class adapted for use with a skillet, frying-pan, or other shallow cooking utensil and whereby a variety of cooking operations may be performed.

Figure 1:
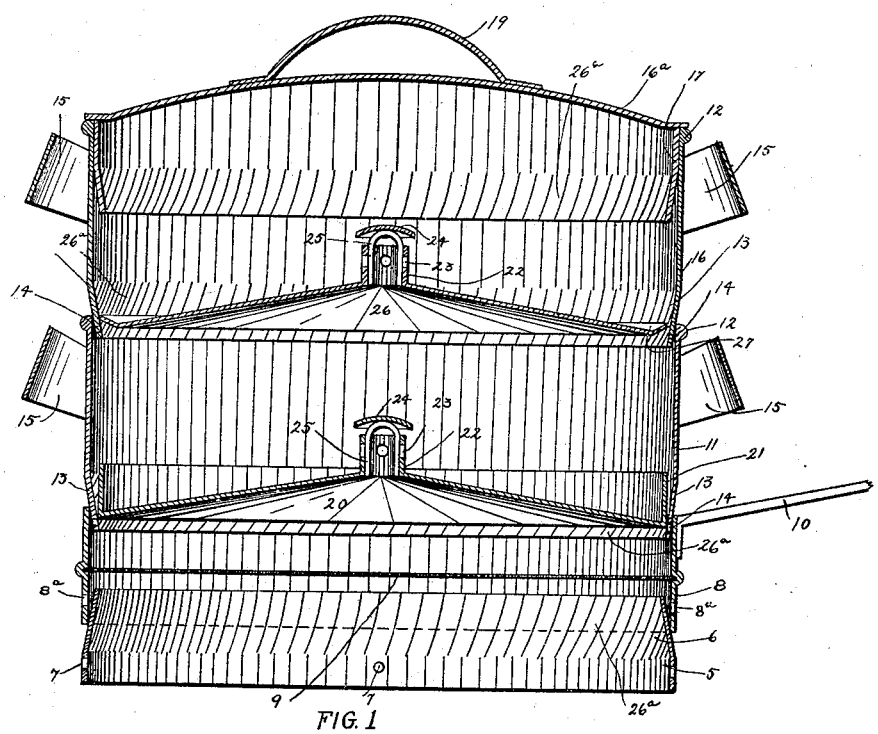
Figure 2:
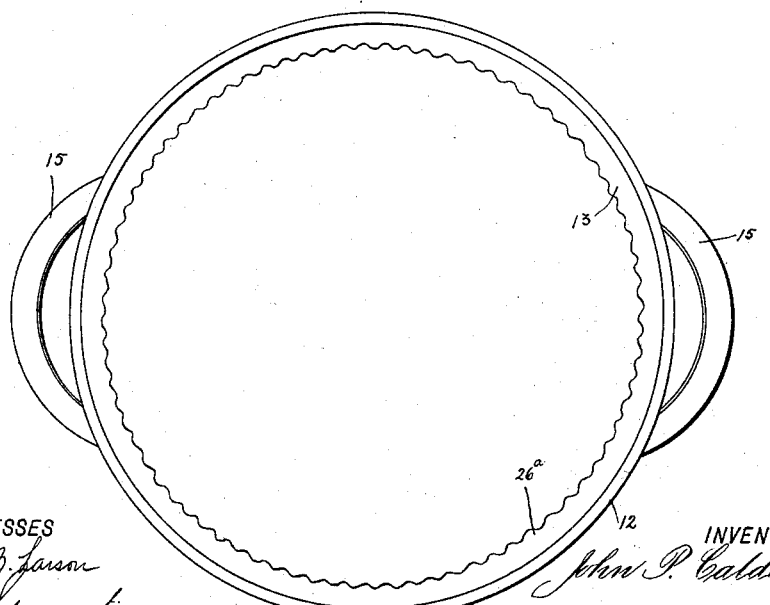
Figure 3:
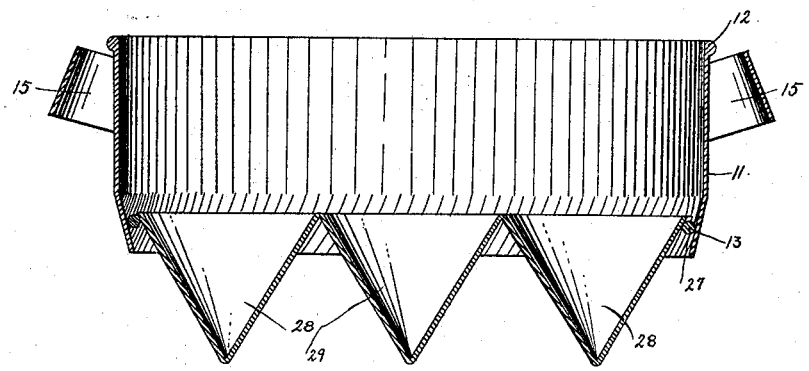

My invention consists in the construction and arrangement of parts, as hereinafter fully set forth.
In the accompanying drawings, forming part of this specification, in which like reference characters denote like parts in the several views, Figure 1 is a central vertical section of a cooking apparatus constructed according to my invention; Fig. 2, a plan view of a part thereof; Fig. 3, a central vertical section of an element thereof not shown in Fig. 1, and Fig. 4 a plan view thereof.

In the practice of my invention I provide an annular base member 5, the upper portion 6 whereof is inwardly deflected and provided with a plurality of perforations, one of which is shown at 7. The base 6 is adapted to be fitted into a skillet, steam-pan, or similar utensil, (not shown,) resting upon the bottom thereof, and water is poured between the rim or side wall thereof and the upwardly-deflected portion 6 of the base 5, passing through the perforations 7.
Upon the base 5 I superimpose an annular member 8, provided with a central transverse foraminated diaphragm 9 and also provided at one side with a projecting handle 10. The annular member 8 fits the inwardly-directed portion 6 of the base 5 and is provided in the bottom portion with a plurality of perforations 8ª.

Upon the member 8 I superimpose an annular member 11, provided at the top with a peripheral bead 12 and at the bottom with an inwardly-deflected portion 13, provided with a plurality of perforations 14. Handles 15 are provided at either side of the member 11. A member 16 is superimposed upon the member 11, fitting within the upper portion or rim thereof and of the same construction as the member 11 and provided with a cover 16ª, which latter is provided with a depending peripheral flange 17, the lower portion 18 of which is inwardly deflected. The cover 16ª is also provided with a handle 19. A circular disk member 20 is also provided and is formed with a relatively-raised center, slanting from said center to the periphery thereof, as shown in the drawings, the said periphery being deflected upwardly to form a vertical annular rim 21 and the central portion being struck up to form an annular collar 22, plurally perforated, as at 23. A cap 24 is supported above and slightly extending beyond the transverse plane of the collar 22 by means of a curved support 25. The disk member 20 in the preferred assembling of the several members of my apparatus fits within the member 11, resting in engagement with the inwardly-directed portion 13 thereof. I provide another disk member 26 similar in all respects to the disk member 20, excepting that the periphery 27 thereof is only slightly upwardly directed, and said disk member 26 rests in the member 13, being supported in engagement with the inwardly-deflected portion thereof.

In constructing the members 11 and 16, the cover 16ª, and the base 5 I form the deflected portions 13 13, 18, and 6, respectively, with a plurality of flutings or corrugations 26ª, whereby the several members fit together more closely and securely in assembled positions.

Figure 4:
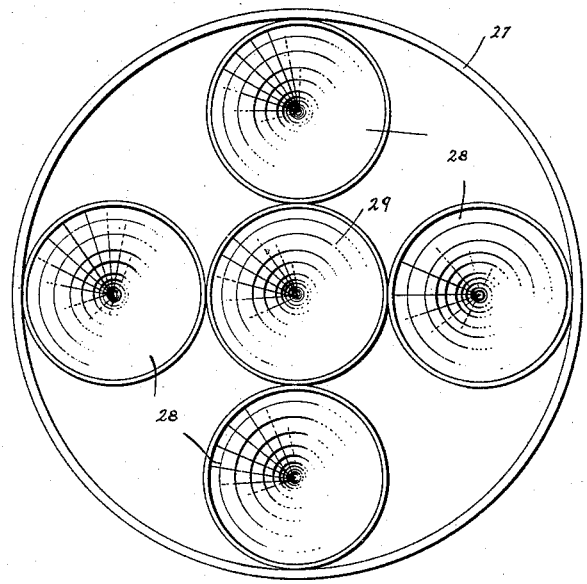

In Figs. 3 and 4 I have shown the member 11 above described provided with an attachment for cooking eggs and similar articles and which consists of an annular support 27, with which, at one side of each, are connected a plurality of conical cups 28, the apices of which are downwardly directed and open at the top. Connected with the cups 28 and arranged intermediate thereof is another similar cup 29.

In using my improved cooking apparatus with the several parts and members thereof assembled as shown in Fig. 1 the base 5 is set into a skillet or other shallow utensil, which is filled with water and placed over any suitable heater. Upon the perforated diaphragm 9 may be placed vegetables or other food material and upon each of the disk members 20 and 26 may be placed meats, puddings, or other culinary articles, as desired. As soon as steam begins to form in the skillet above mentioned it rises through the diaphragm 9, which serves to spread and disseminate it throughout the interior of the member 8 above said diaphragm, and it is then collected by the cup-like form of the disk member 20 and passed upwardly through the collar 22, being emitted from the same through the perforations 23 and also at the top of the same, where it will be disseminated within the member 11 by the cap 24. Similarly the steam is thence passed upwardly through the collar 22 of the disk member 26, and thence disseminated throughout the member 16, where it gathers in quantities, unless the cover 16ᵃ be removed, which is done when the quantity of rising steam warrants such procedure. It is manifest that the steam passing through the several members performs a series of cooking operations and that when said members have become so heated as to preclude undue condensation of the steam upon the walls thereof the potential of the steam is but slightly decreased in such passage. Each of the members 8, 11, and 16 may be independently used in connection with the skillet or other utensil and all may be readily mutually detached, which operation is facilitated by the handles 10 and 15.

The economy of operation of my improved cooking apparatus as described is evident.

In using the device shown in Figs. 3 and 4 the member 11 is supported in or over a skillet in any preferred manner and eggs, custards, or other food articles are readily cooked in the cups 28 and 29.

I do not limit myself to the precise form and arrangement of parts herein described, but reserve the right to vary the same within the scope of my invention.

Having fully described my invention, I claim as new and desire to secure by Letters Patent—

1. The herein-described cooking apparatus, comprising a base adapted to be seated in a skillet or vessel, and a plurality of members adapted to be superimposed upon said base, and comprising an annular member 8, which fits the upper portion of said base member, which upper portion is inwardly deflected, said annular member 8 being provided with a transverse foraminated diaphragm, an annular member 11 provided at its bottom with an inwardly-deflected portion 13 adapted to be seated within the annular member 8, and a conical disk member 20 which is centrally perforated and which is seated upon the inwardly-deflected portion 13 of the member 11, substantially as shown and described.

2. The herein-described cooking apparatus, comprising a base adapted to be seated in a skillet or vessel, and a plurality of members adapted to be superimposed upon said base, and comprising an annular member 8, which fits the upper portion of said base member, which upper portion is inwardly deflected, said annular member 8 being provided with a transverse foraminated diaphragm, an annular member 11 provided at its bottom with an inwardly-deflected portion 13 adapted to be seated within the annular member 8, and a conical disk member 20 which is centrally perforated and which is seated upon the inwardly-deflected portion 13 of the member 11, said member 20 being provided with an annular collar 22 which surrounds said central perforation therein, and is provided with a cap 24, whereby the steam passing through said central perforation is disseminated through said disk member, substantially as shown and described.

In testimony that I claim the foregoing as my invention I have signed my name, in presence of the subscribing witnesses, this 23d day of November, 1899.

JOHN PARK CALDWELL.

Witnesses:
CHARLIE S. MERCK,
JAMES P. LEAGUE.